(12) United States Patent
Kable et al.

(10) Patent No.: US 6,282,806 B1
(45) Date of Patent: Sep. 4, 2001

(54) SELF-CENTERING ARBOR

(75) Inventors: Daniel J. Kable, Monroe; Donald E. Altevogt, New Haven; Teddis L. Jackson, Woodburn, all of IN (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/492,812

(22) Filed: Jan. 28, 2000

(51) Int. Cl.$^7$ .................................................. G01D 21/00
(52) U.S. Cl. ............................. 33/520; 33/600; 33/644; 33/645
(58) Field of Search .......................... 33/520, 613, 644, 33/645, 600, 608, 574, 577

(56) References Cited

U.S. PATENT DOCUMENTS

| | | |
|---|---|---|
| 902,738 | 11/1908 | Jones . |
| 1,936,160 * | 11/1933 | George .................................... 33/520 |
| 2,030,244 | 2/1936 | Cox . |
| 2,109,976 * | 3/1938 | Pierce, Jr. ............................... 33/520 |
| 2,499,781 | 3/1950 | Rothenberger . |
| 2,766,532 | 10/1956 | Eisele . |
| 2,884,699 | 5/1959 | Eisele . |
| 2,994,131 | 8/1961 | Gaylord . |
| 3,026,621 | 3/1962 | Papps et al. . |
| 3,753,570 | 8/1973 | Espasa . |
| 4,062,124 | 12/1977 | Albertazzi . |
| 4,700,488 * | 10/1987 | Curti ...................................... 33/613 |
| 4,773,164 | 9/1988 | Taylor et al. . |
| 4,884,348 | 12/1989 | Zeller et al. . |

* cited by examiner

Primary Examiner—Andrew H. Hirshfeld
(74) Attorney, Agent, or Firm—Liniak, Berenato, Longacre & White

(57) ABSTRACT

A self-centering arbor adapted to locate a hole in a mechanical object having coaxial openings, such as brackets, bushings or the like, with vastly improved accuracy and repeatability. The self-centering arbor comprises two opposite free floating, spring biased, coaxial, tapered pins mounted in a housing member for engagement with the openings in the axle bracket or the like. The housing includes opposite first and second housings interconnected by a mandrel shaft. Furthermore, two spherical locating members are secured to the housing member and are oppositely aligned on an axis of the tapered pin.

17 Claims, 5 Drawing Sheets

SELF-CENTERING ARBOR

BACKGROUND OF THE INVENTION

1. Field of the Invention

The present invention relates to self-centering arbors, and more particularly to a self-centering arbor for determining positions of axle brackets and other automotive components.

2. Description of the Prior Art

In the evolution of the modern motor vehicles, the quality of the vehicles has become increasingly more important; particularly, the quality of manufacturing of the vehicles. The quality and performance of the vehicles depend in no small part on the quality of manufacturing of an axle assembly. The vehicular axle assembly includes a plurality of various different brackets and bushings having coaxial holes. In assembling the axle components, it is of utmost importance to accurately locate the axle brackets and bushings. The measuring devices currently used in the vehicular axle manufacturing, such as expending arbors, are unable to determine true location and have poor repeatability.

The need therefore exists for a self-centering arbor assembly that accurately and consistently locates axle brackets, bushings and the like in an efficient and inexpensive manner.

SUMMARY OF THE INVENTION

The present invention alleviates the drawbacks of the prior art. The present invention provides a self-centering arbor adapted to locate a hole in a mechanical object having coaxial openings, such as brackets, bushings or the like, with vastly improved accuracy and repeatability.

The self-centering arbor in accordance with the present invention comprises two opposite free floating, spring biased, coaxial, tapered pins mounted in a housing member for engagement with the openings in the axle bracket or the like. The housing includes opposite first and second housings interconnected by a mandrel shaft. Furthermore, two spherical locating members are secured to the housing member and are oppositely aligned on an axis of the tapered pin.

BRIEF DESCRIPTION OF THE DRAWINGS

Other objects and advantages of the invention will become apparent from a study of the following specification when viewed in light of the accompanying drawings, wherein.

DETAILED DESCRIPTION

Figure 1:
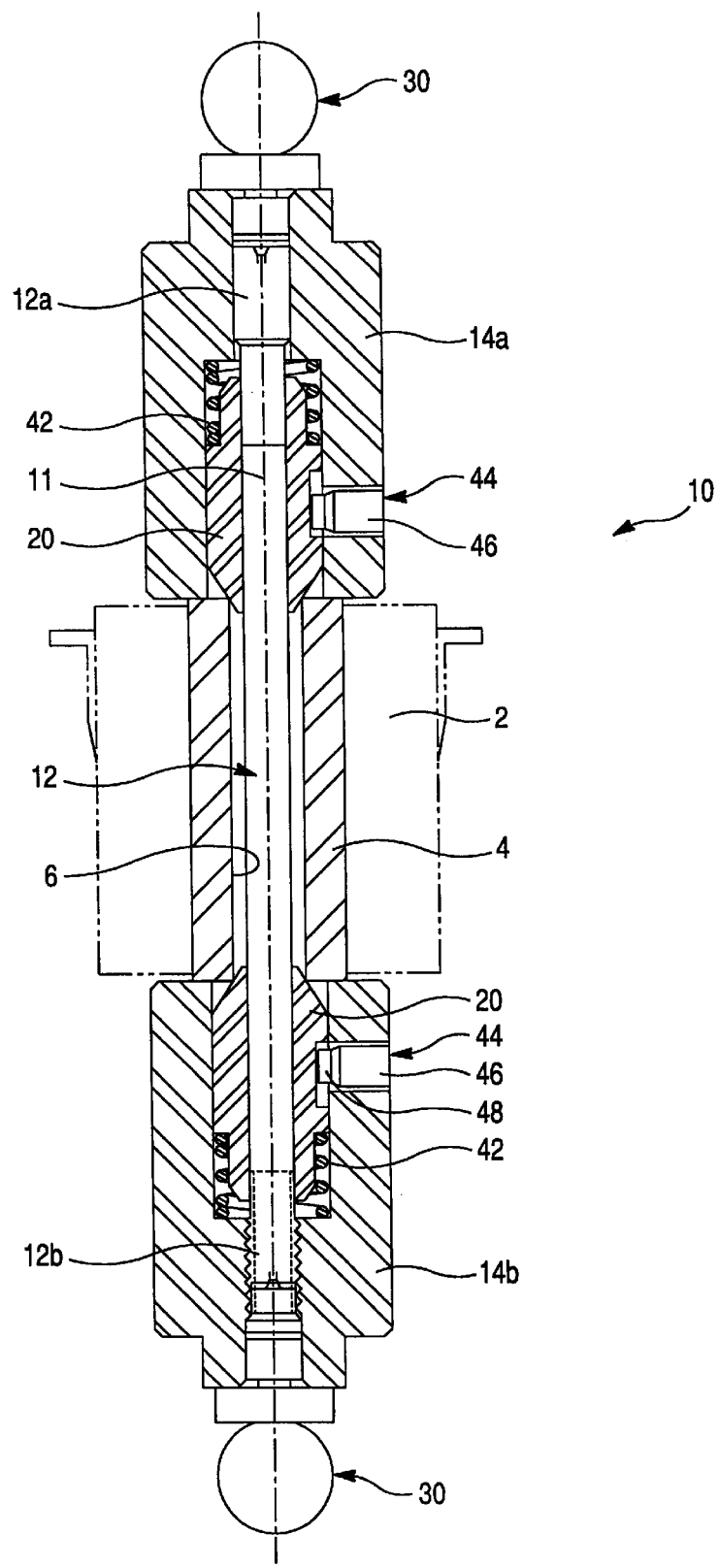
FIG. 1 is a cross-sectional view of a self-centering arbor mounted on an axle bushing in accordance with the first embodiment of the present invention.

FIG. 1 of the drawings illustrates a novel arrangement a self-centering arbor 10 in accordance with the first embodiment of the present invention, employed for gauging a position of various vehicle axle components having opposite coaxial openings (particularly axial centers of the coaxial openings), such as bushings, brackets, or the like. In this particular embodiment, the self-centering arbor 10 is employed to locate the axial centers of end openings in a central aperture 6 in a hollow core 4 of a bushing 2.

Figure 3:
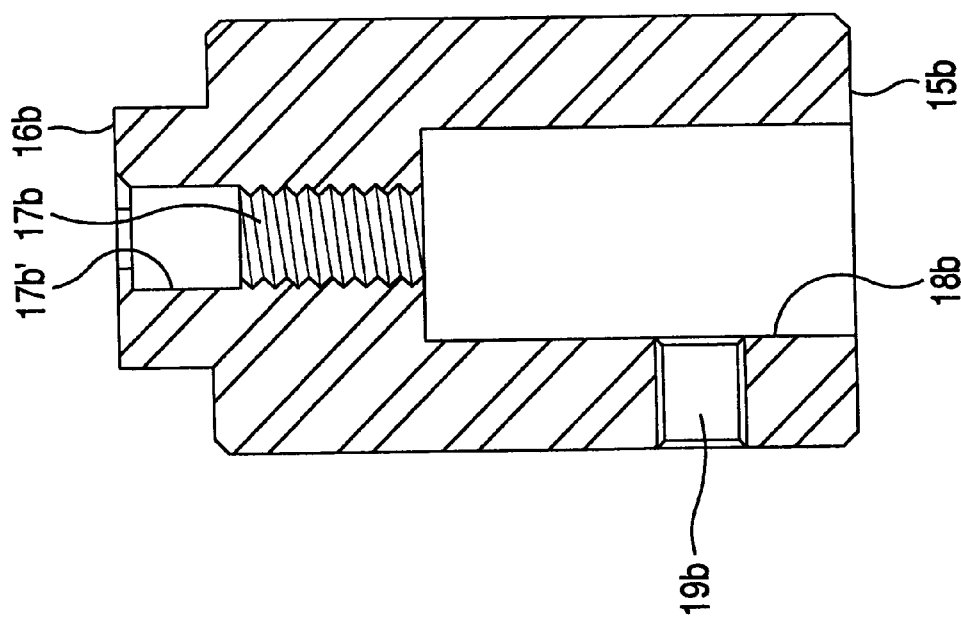
FIG. 3 is a cross-sectional view of a second housing in accordance with the first embodiment of the present invention.
Figure 2:
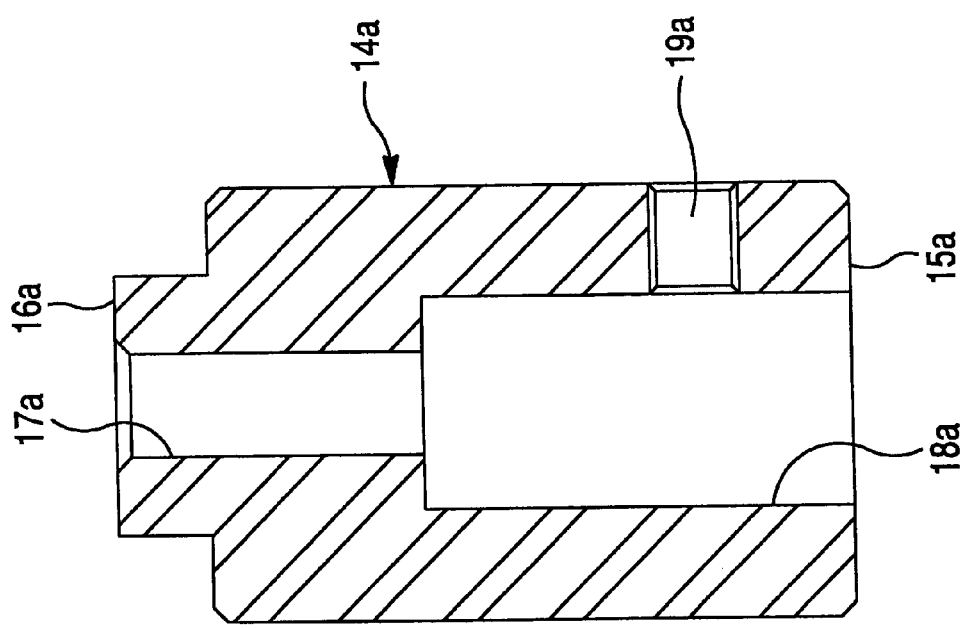
FIG. 2 is a cross-sectional view of a first housing in accordance with the present invention.

The self-centering arbor 10 comprises a longitudinal axis 11 and a mandrel shaft 12 disposed coaxially with the axis 11. The shaft 12 has a first end 12a and a second threaded end 12b opposite to each other. The self-centering arbor 10 further comprises a first housing 14a and a second housing 14b secured to the opposite ends 12a and 12b of the mandrel shaft 12 correspondingly. More specifically, the first housing 14a, illustrated in detail in FIG. 2, has an inner end 15a, an outer end 16a, an axial hole 17a therethrough and a bore 18a. The first end 12a of the shaft 12 is inserted into the axial hole 17a through the inner end 15a and is fixedly fastened to the first housing 14a (preferably by interference fitting). The second housing 14b, illustrated in detail in FIG. 3, has an inner end 15b, an outer end 16b, a threaded axial hole 17b therethrough and a bore 18b. The second end 12b of the shaft 12 is inserted into the axial hole 17b through the inner end 15b and is threadedly fastened to the second housing 14b. Thus, the second housing 14b is adapted to be adjustably positioned along the second end 12b of the shaft 12 and could be completely removed from the shaft 12.

Figure 4:
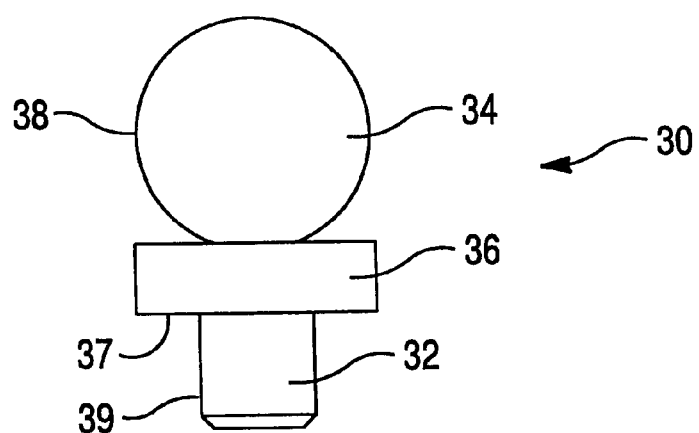
FIG. 4 is a cross-sectional view of a locating member in accordance with the present invention.

As illustrated in FIG. 1, each of the first and second housings 14a and 14b respectively, is provided with a locating member 30 that is affixed to the outer ends thereof. The locating members 30 are adapted to indicate axial centers of the end openings in the aperture 6 in the bushing 2. Each of two generally identical locating members 30, shown in detail in FIG. 4, has a hole-engaging supporting portion 32, a gauging portion 34 and an enlarged intermediate portion 36. The supporting portion 32 and the gauging portion 34 are formed in accurately coaxial relation. The gauging portion preferably has a spherical surface 38 and a precisely held diameter that is the same for all locating members. The spherical gauging surface 38 is formed on a center that lies on the longitudinal axis 11 of the self-centering arbor 10.

The supporting portion 32 of the first locating member 30 is fittingly engaged in the hole 17a in the first housing 14a, whereas the supporting portion 32 of the second locating member 30 is fittingly engaged in a hole 17b' in the second housing 14b, coaxial to the hole 17b and adjacent to the outer end 16b. A diameter of the hole-engaging supporting portion 32 is determined by that of the holes 17a and 17b' to be engaged. This hole-engaging portion 32 may be formed with threads corresponding to threads of the holes 17a and 17b', or with a substantially cylindrical portion 39, preferably having a slight taper for a part of its length for engaging an internal surface of the plain holes 17a and 17b'. Accurate centering of the locating member 30 in the hole (coaxial with the axis 11) is insured by the tapered shape of the part of the portion 39 in combination with the engagement of a shoulder 37 on the locating member 30 with the outer end of the housings 14a and 14b. The shoulder 37 is part of the intermediate portion 36 and is formed precisely perpendicularly to an axis (not shown) of the locating member 30 that is coaxial to the axis 11.

As illustrated in FIG. 1, the self-centering arbor 10 of the present invention is further provided with a pair of generally identical free floating pins 20 disposed opposite to each other in the corresponding bores 18a and 18b of the first and second housings 14a and 14b respectively. Each of the floating pins 20, further illustrated in detail in FIG. 5, includes a cylindrical portion 22, a tapered end 24 and a collar portion 26. Furthermore, the pin 20 is provided with an axial opening 28 therethrough. The opening 28 in the pin 20 slidingly engages the mandrel shaft 12 so that the pin 20 is movable along the shaft 12 coaxially with the axis 11.

The tapered end 24 is adapted to engage one of the opposite openings in the hollow core 4 of the bushing 2. In order to bias the pins 20 toward the openings in the bushing 2, the arbor 10 is provided with a pair of resilient spring members 42, such as coil springs or the like. Each of the spring members 42 is disposed within the bore (18a or 18b) of the housing (14a or 14b) between the pin 20 and the outer end (16a or 16b) of the housing. The spring member 42 is resiliently engaging the collar portion 26 urging the pin 20 toward the open end (15a or 15b) of the housing.

In order to restrict the axial movement of and retain the pins 20 within the bores 18a and 18b, each of the housings 14a and 14b is provided with a stop member 44, preferably in the form of a screw 46 threaded into threaded bore 19a or 19b formed in the first and second housing 14a and 14b respectively. Correspondingly, each of the pins 20 is provided with an elongated axial notch 23 formed on the cylindrical portion of the pin 20. A tip 48 of the screw 46 protrudes into the notch 23, thus limiting the axial movement of the pin 20 and preventing the pin 20 from falling out of the housing 14b when it is removed from the shaft 12.

In operation, the second housing 14b is first detached from the mandrel axle 12 along with the pin 20. Then, the mandrel axle 12 is inserted into the hollow core 4 of the bushing 2 of the axle assembly, and the second housing 14b is threaded back to the shaft 12 and tightened until tapered ends 24 of the both pins 20 engage the opposite openings in the hollow core 4 of the bushing 2 and the spring members 42 are slightly compressed. The free floating tapered pins 20 accurately align the arbor 10 with the hollow core 4 of the bushing 2. Thereafter, a coordinate-measuring machine (CMM) (not shown) locates the center of the spherical surface 38 of the gauging portion 34 of each locating member 30. Thus, quick and accurate measurement of the location of axle bushings is provided.

It is, of course, understood that the foregoing self-centering arbor could equally be employed for measurement of the location not only bushings, but also of various axle brackets.

Figure 6:
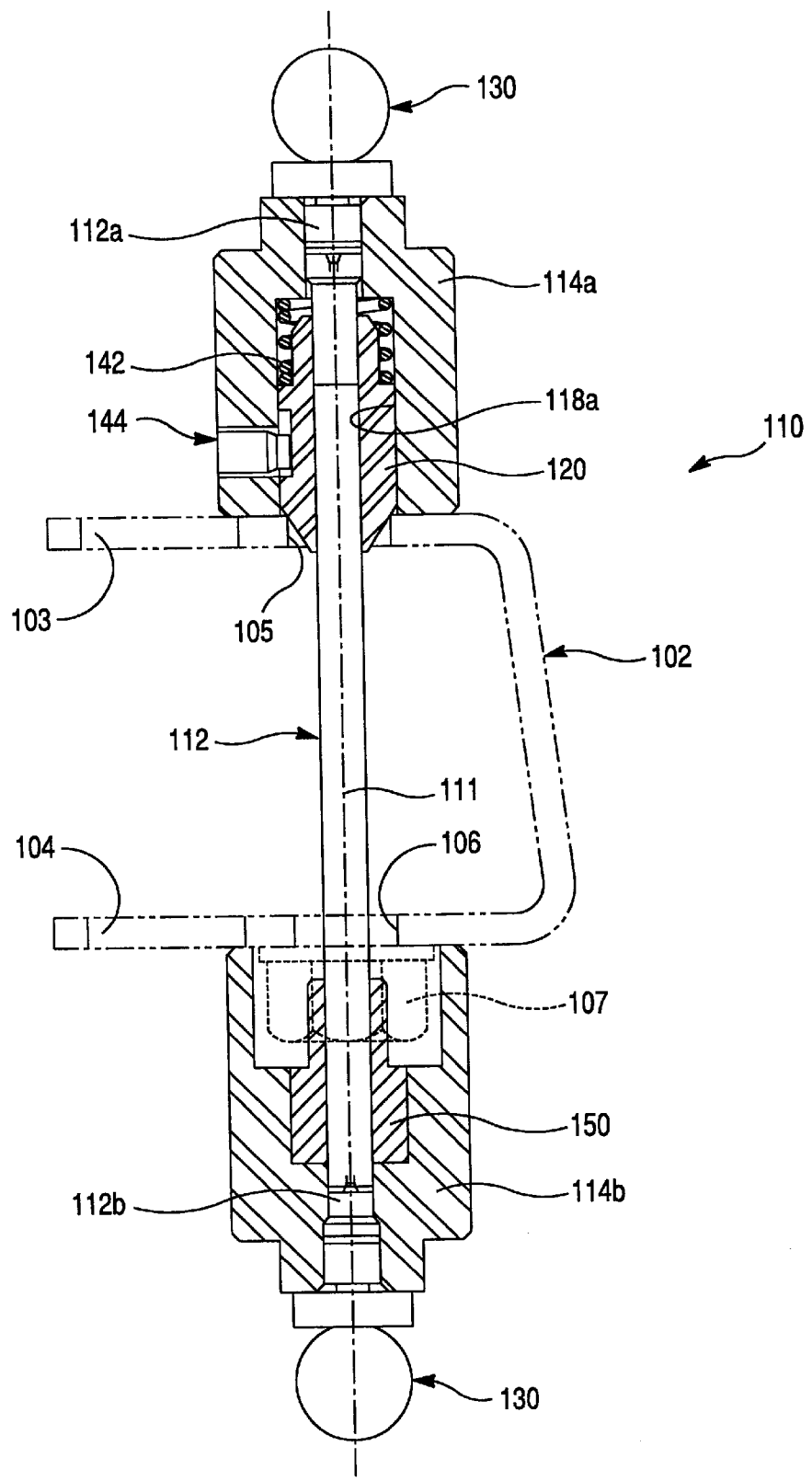
FIG. 6 is a cross-sectional view of a self-centering arbor mounted on an axle bushing in accordance with the second embodiment of the present invention.

FIG. 6 illustrates a self-centering arbor 110 in accordance with a second embodiment of the present invention, used for gauging a position of a U-shaped axle bracket 102 comprising two protruding arms 103 and 104 provided with coaxial openings 105 and 106 respectively, wherein the arm 104 is provided with a nut affixed thereto coaxially with the opening 106.

The self-centering arbor 110 comprises a longitudinal axis 111 and a mandrel shaft 112 disposed coaxially with the axis 111. The shaft 112 has a first end 112a and a second threaded end 112b. The self-centering arbor 110 further comprises a first housing 114a and a second housing 114b secured to the opposite ends 112a and 112b of the mandrel shaft 112 correspondingly. The first housing 114a is similar to the housing described in relation to FIG. 2.

Figure 7:
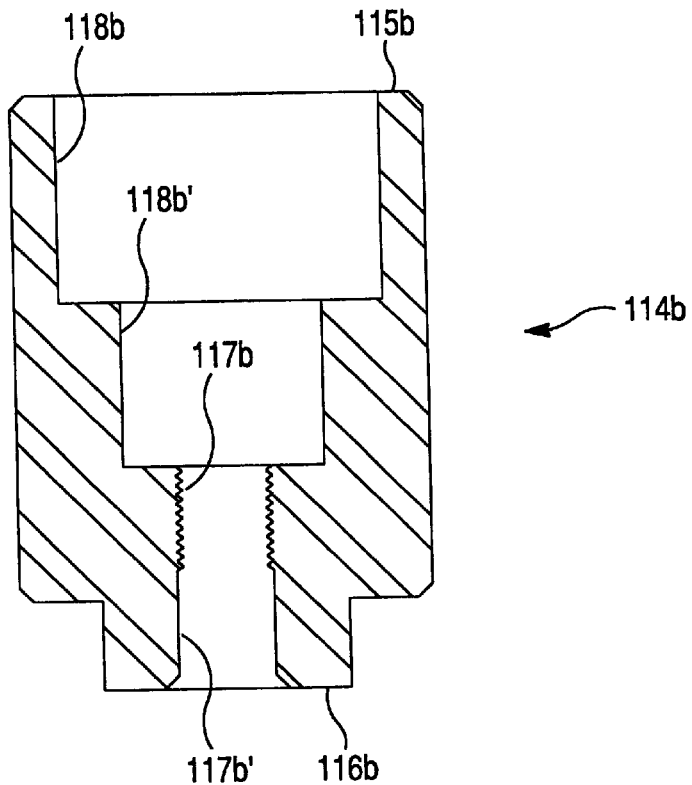
FIG. 7 is a cross-sectional view of a second housing in accordance with the second embodiment of the present invention.

The second housing 114b, illustrated in detail in FIG. 7, has an inner end 115b, an outer end 116b, a threaded axial hole 117b therethrough, a first bore 118b and a second bore 118b'. The first bore 118b is adapted to receive the nut 107, while the second bore 118b' is adapted to receive a nut adapter 150. The nut adapter is used to position the second housing 114b coaxially with the nut 107 and, correspondingly, with the opening 106.

Figure 8:
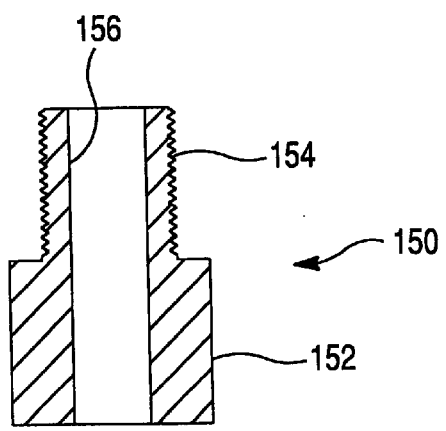
FIG. 8 is a cross-sectional view of a nut adapter in accordance with the second embodiment of the present invention.

The nut adapter 150, illustrated in detail in FIG. 8, includes a head portion 152 and a threaded portion 154, and is provided with a hole 156. The head portion 152 is secured inside the second bore 118b' preferably by press-fitting. The threaded portion 154 is provided with exterior threads corresponding to interior threads of the nut 107.

The second end 112b of the shaft 112 is inserted through the hole 156 in the nut adapter 150 into the axial hole 117b in the housing 114b through the inner end 115b and is threadedly fastened to the second housing 114b. Thus, the second housing 114b is adapted to be adjustably positioned along the second end 112b of the shaft 112 and could be completely removed from the shaft 112.

As illustrated in FIG. 6, each of the first and second housings 114a and 114b respectively, is provided with a locating member 130 that is affixed to the outer ends thereof. The locating members 130 are adapted to indicate axial centers of the openings in the axle bracket 102. Each of two generally identical to locating members 130 is similar to the locating member described in connection with FIG. 4.

As illustrated in FIG. 6, the self-centering arbor 110 of the present invention is further provided with a free floating pin 120 disposed in the bore 118a of the first housing 114a. The pin 120 is similar to the free floating pin 20 described in connection with FIG. 5. A resilient spring member 142 is provided in order to bias the pin 120 toward the toward an open end of the first housing 114a.

Figure 5:
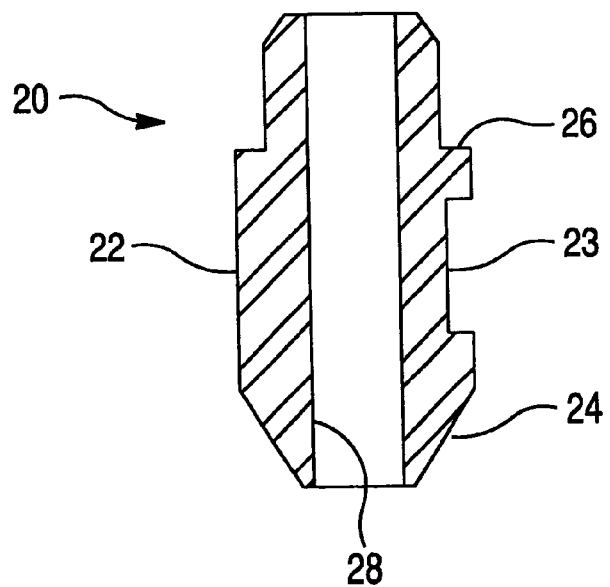
FIG. 5 is a cross-sectional view of a free-floating pin in accordance with the present invention.

In order to restrict the axial movement of and retain the pin 120 within the first housings 114a, a stop member 144 is provided which is similar to the stop member 44 described in connection with FIG. 5.

In operation, the second housing 114b is first detached from the mandrel axle 112 along with the pin 120. Then, the mandrel axle 112 is inserted into the openings 105 and 106 of the bracket 102 of the axle assembly so that the tapered end 124 of the pin 120 engages the opening 105 in the bracket 102, and the second housing 114b is threaded back to the shaft 112. At the same time, the nut adapter 150 is threaded into the nut 107, which is received inside the second housing 114b. Next, the second housing 114b is tightened until the spring member 142 is slightly compressed. Thus, the free floating tapered pin 120 accurately aligns the locating member 130 affixed to the first housing 114a with the opening 105 and the nut adapter 150 accurately aligns the locating member 130 affixed to the second housing 114b with the opening 106. Thereafter, the coordinate-measuring machine (CMM) (not shown) locates the center of the spherical surface 138 of the gauging portion 134 of each locating member 130.

Therefore, the novel arrangement of the self-centering arbor of the present invention as constructed in the above-described embodiments provides quick and accurate measurement of the location of various and different bushings and brackets having coaxial openings. When used in manufacturing vehicular axle assemblies, the present invention allows to reduce the production cost and improve the quality of the axle assembly.

The foregoing description of the preferred embodiments of the present invention has been presented for the purpose of illustration in accordance with the provisions of the Patent Statutes. It is not intended to be exhaustive or to limit the invention to the precise forms disclosed. Obvious modifications or variations are possible in light of the above teachings. The embodiment disclosed hereinabove was chosen in order to best illustrate the principles of the present invention and its practical application to thereby enable those of ordinary skill in the art to best utilize the invention in various embodiments and with various modifications as are suited to the particular use contemplated, as long as the principles described herein are followed. Thus, changes can be made in the above-described invention without departing from the intent and scope thereof. It is also intended that the scope of the present invention be defined by the claims appended thereto.

What is claimed is:

1. A self-centering arbor for gauging a hole location in a mechanical object having opposite coaxial openings, said arbor comprising:
   a mandrel shaft having a longitudinal axis of symmetry;
   a floating pin having a tapered end adapted for engaging one of the coaxial openings in the object, said pin being coaxial with said mandrel shaft and said axis;
   at least one spring member adapted to urge said pin into a contact with said one opening;
   a housing member housing said pin and said spring member;
   a centering device for centering said mandrel shaft within the other of the coaxial openings, said centering device being removably attached to said shaft;
   a pair of oppositely disposed locating members connected to opposite ends of said shaft and aligned with said axis, said locating members adapted to indicate axial centers of said openings.

2. The self-centering arbor as defined in claim 1, wherein said housing member further includes a stop means for limiting axial movement of said pin along said shaft.

3. The self-entering arbor as defined in claim 1, wherein said centering device includes a second floating pin having a tapered end adapted for engaging said other opening, said second floating pin being coaxial with said mandrel shaft and said axis, said centering device also including a second spring member adapted to urge said second floating pin into contact with said other opening.

4. The self-centering arbor as defined in claim 3, further comprising:
   a second housing receiving said second pin.

5. The self-centering arbor as defined in claim 4, wherein said housings each include a stop means for limiting axial movement of said pins along said shaft.

6. The self-centering arbor as defined in claim 4, wherein said second housing is threadedly secured to said shaft.

7. The self-centering arbor as defined in claim 3, wherein said spring members are each a coil spring.

8. The self-centering arbor as defined in claim 1, wherein each of said locating members has spherical gauging surfaces.

9. The self-centering arbor as defined in claim 1, wherein said spring member is a coil spring.

10. A self-centering arbor for gauging a position of a mechanical object having opposite coaxial openings, said arbor comprising:
    a longitudinal axis of symmetry;
    a mandrel shaft coaxial to said axis, said shaft having a first end and a second end;
    a first housing having an axial hole therethrough coaxial to said axis, said first housing having an inner end and an outer end, said first housing provided with a bore at said inner end thereof, said housing having a locating member affixed to said outer end thereof coaxially with said axis;
    a second housing having an axial hole therethrough coaxial with said axis, said second housing having an inner end and an outer end, said second housing provided with a bore at said inner end thereof, said housing having a locating member affixed to said outer end thereof coaxially with said axis;
    a floating pin having a tapered end, said tapered end adapted to engage one of the openings in the mechanical object, said pin provided with an axial hole therethrough receiving said shaft, said floating pin disposed in said first housing with said tapered end facing said inner end of said first housing, said pin being axially movable within said first housing bore along said shaft;
    a spring member disposed within said first housing bore, said spring member adapted to urge said pin into a contact with said one opening;
    said shaft is extending through said holes in said first and second housings;
    said first housing being fixedly secured to said first end of said shaft;
    said second housing being axially adjustably and removably secured to said second end of said shaft, said second housing having a centering device therein for centering said shaft within the other of the coaxial openings, and
    a pair of locating members affixed to said outer ends of said housings opposite to each other and aligned with said axis, said locating members adapted to indicate centers of the openings,
    wherein said inner end of said first housing is facing said inner end of said second housing.

11. The self-centering arbor as defined in claim 10, wherein said first housing further includes a stop means for limiting axial movement of said pin along said shaft.

12. The self-centering arbor as defined in claim 10, wherein each of said locating members has spherical gauging surface.

13. The self-centering arbor as defined in claim 10, wherein said centering device includes a second floating pin having a tapered end adapted for engaging said other opening, said second floating pin being coaxial with said mandrel shaft and said axis, said centering device also including a second spring member adapted to urge said second floating pin into contact with said other opening.

14. The self-centering arbor as defined in claim 13, wherein each of said first and second housings further including a stop means limiting axial movement of said pins along said shaft.

15. The self-centering arbor as defined in claim 10, wherein said second housing is threadedly secured to said second end of said shaft.

16. The self-centering arbor as defined in claim 10, wherein said spring member is a coil spring.

17. A self-centering arbor for gauging a position of a mechanical object having opposite coaxial openings, said arbor comprising:
    a mandrel shaft having a first end and a second end;
    a first generally cylindrical housing having an axial opening therethrough, said first housing having an inner end and an outer end, said first end of said shaft extends through said opening in said first housing and is fixedly secured to said outer end of said first housing;

a second housing having an axial opening therethrough, said second housing having an inner end and an outer end, said second end of said shaft extends through said opening in said second housing and is axially adjustably and removably mounted to said outer end of said second housing;

first and second floating generally cylindrical pins each having a truncated tapered end, said pins provided with axial opening therethrough receiving said shaft;

said first pin is disposed in a bore formed in said first housing at the inner end thereof with said tapered end of said first pin facing said inner end of said first housing, said first pin being slidingly mounted over said shaft;

said second pin is disposed in a bore formed in said second housing at the inner end thereof with said tapered end of said second pin facing said inner end of said second housing, said first pin being slidingly mounted over said shaft;

a pair of spring members each disposed within said bores formed in said first and second housings adapted to urge said corresponding pins toward said inner ends of said housings;

stop means secured to each of said housings for limiting axial movement of said pins, wherein each of said pins including an elongated axial slot on an outer peripheral surface thereof for engaging said respective stop means.

* * * * *